US009133928B2

United States Patent
Conti et al.

(10) Patent No.: US 9,133,928 B2
(45) Date of Patent: Sep. 15, 2015

(54) AUTOFUNCTION CONTROL SYSTEM FOR MOTOR VEHICLES

(75) Inventors: Gianluca Conti, Nonantola (IT); Rocco Petrigliano, Valsinni (IT)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/521,280

(22) PCT Filed: Jan. 12, 2011

(86) PCT No.: PCT/EP2011/050363
§ 371 (c)(1),
(2), (4) Date: Dec. 5, 2012

(87) PCT Pub. No.: WO2011/086109
PCT Pub. Date: Jul. 21, 2011

(65) Prior Publication Data
US 2013/0073155 A1    Mar. 21, 2013

(30) Foreign Application Priority Data

Jan. 13, 2010    (IT) .................................. BO10A0011

(51) Int. Cl.
| | |
|---|---|
| *B60W 10/06* | (2006.01) |
| *F16H 59/50* | (2006.01) |
| *B60W 10/103* | (2012.01) |
| *B60W 30/188* | (2012.01) |
| *F16H 61/462* | (2010.01) |
| *F16H 61/475* | (2010.01) |

(52) U.S. Cl.
CPC .............. *F16H 59/50* (2013.01); *B60W 10/06* (2013.01); *B60W 10/103* (2013.01); *B60W 30/1882* (2013.01); *F16H 61/462* (2013.01); *F16H 61/475* (2013.01); *B60W 2510/0652* (2013.01); *B60W 2510/0661* (2013.01); *B60W 2710/0677* (2013.01); *B60W 2710/1016* (2013.01); *B60Y 2200/22* (2013.01); *B60Y 2200/221* (2013.01)

(58) Field of Classification Search
CPC . B60W 30/18; B60W 10/06; B60W 30/1882; B60W 10/103; B60W 10/10–10/108; F16H 61/475; F16H 61/462; F16H 2061/124; F16H 2059/363
USPC .................... 701/56, 51, 55, 65, 50; 180/338; 477/34, 43, 97, 115
See application file for complete search history.

(56) References Cited

U.S. PATENT DOCUMENTS 4,663,713 A * 5/1987 Cornell et al. .................. 701/52
4,885,690 A * 12/1989 Schimmel et al. .............. 701/54
(Continued)

OTHER PUBLICATIONS

Molle, R. (2004). Control and operating behavior of continuously variable chain transmissions. 2004 International Continuously Variable and Hybrid Transmission Congress. (See pp. 2, 5-7).*

*Primary Examiner* — Tuan C. To
*Assistant Examiner* — Genna Mott
(74) *Attorney, Agent, or Firm* — Sue C. Watson (57) ABSTRACT

An autofunction control system for motor vehicles comprising an engine, a transmission and an accelerator, the position of the accelerator defining a set ERPM, the system configured to define a desired percentage of maximum available power for each set ERPM, the system configured to control the transmission ratio of the transmission to load the engine at least to the desired percentage of power, wherein the desired percentage of power is a function of the set ERPM when the set ERPM is between a low threshold and a high threshold, and wherein the system is configured to control the transmission ratio to load the engine closest to the maximum available absolute power for the engine for a set ERPM above the high threshold ERPM.

7 Claims, 8 Drawing Sheets

(56) References Cited

U.S. PATENT DOCUMENTS

| | | | |
|---|---|---|---|
| 5,406,483 A * | 4/1995 | Kallis et al. | 701/53 |
| 6,169,950 B1 * | 1/2001 | Parigger | 701/53 |
| 6,244,986 B1 * | 6/2001 | Mori et al. | 477/46 |
| 7,686,737 B2 * | 3/2010 | Nishi et al. | 477/115 |
| 2010/0063704 A1 * | 3/2010 | Okubo et al. | 701/99 |

* cited by examiner

FIG.8

AUTOFUNCTION CONTROL SYSTEM FOR MOTOR VEHICLES

CROSS REFERENCE TO RELATED APPLICATIONS

This application is the US National Stage filing of International Application Ser. No. PCT/EP/2011/050363 filed on Jan. 12, 2011, which claims priority to Italian Application Serial No. BO2010A000011 filed Jan. 13, 2010, each of which is incorporated herein by reference in its entirety for all purposes.

TECHNICAL FIELD

The present invention concerns an autofunction control system for motor vehicles.

In particular, the present invention finds an advantageous, but not exclusive application in the field of agricultural tractors, to which the following description of the invention will explicitly refer without, however, losing its general character.

BACKGROUND

An existing automatic transmission system created by the Applicant involves the use of fixed thresholds, which are however hardly adaptable to all driving and environmental conditions. A poor reactivity, a certain instability of the target gear ratio and low performances with regard to the usable power can be mentioned among the most relevant drawbacks of this prior art system.

Therefore, the main object of the present invention is keeping the tractor engine as close as possible to an appropriate percentage of power at a given setting of the accelerator. In the present invention, if based on the engine requested RPM, the percentage is chosen to maintain the power to an optimal value and, at the same time, to provide for a quality driving experience.

The autofunction control system for motor vehicles is able to control the transmission ratio of the gearbox by means of a continuous adjustment of the transmission ratio for continuously variable transmissions, or by increasing/decreasing the gears for discrete-ratio transmissions.

The progress of the desired power starts from a low percentage at a low RPM up to 100% of power at high speed. Moreover, the percentage of power is affected by the position of the brake pedal. In this way, the system follows the operator's driving style to modify the percentage of power.

Therefore, according to the present invention, it is provided an autofunction control system for motor vehicles according to what stated in the enclosed independent claim, and preferably, in any of the claims directly or indirectly dependent on the aforesaid independent claim.

SUMMARY

An autofunction control system for motor vehicles, the vehicle comprising an engine, a transmission and an accelerator, the position of said accelerator defining a set engine rotation rate (ERPM); and wherein the system may be configured for defining a desired percentage of maximum available power for each set ERPM and for controlling the transmission ratio of the transmission to load the engine at least to the desired percentage of power.

The desired percentage may be a function of the set ERPM when the set ERPM is between a low threshold ERPM and a high threshold ERPM. The desired percentage may be 100% for the set EPM above the high threshold ERPM.

The system may further be configured for controlling the transmission ratio to load the engine closest to the maximum available power of the engine (Pmax) for the set ERPM above a high threshold ERPM.

The rate of change of the transmission ratio is defined according to a first mapping for a first operation mode, the mapping defines the rate of change as a function of ERPM and torque. A rate of change of the transmission ratio may be defined for a further operation mode according to a further mapping. The first operation mode may be a transport mode and the further operation mode is a field mode.

The transmission may be a powershift transmission or a continuously variable transmission. The accelerator may be a hand lever or a foot lever.

The said desired percentage may be below 100% for a set ERPM between said low and high threshold ERPM.

BRIEF DESCRIPTION OF THE DRAWINGS

For a better understanding of the present invention it is now described a preferred embodiment, only as a non-limitative example and with a reference to the enclosed figures, wherein.

DETAILED DESCRIPTION

The strategy of the autofunction system object of the present invention is based on the followings points:

1. "Anti-droop rate", meant as a request of decreasing the transmission ratio to avoid the engine droop.

2. "Go to max rate", meant as a request of increasing the transmission ratio to load the engine up to the desired percentage of power.

3. "Dynamic rate", meant as a request of dynamically correcting the transmission ratio to fulfill the request of desired power.

The system continuously calculates and adds up the three aforementioned contributions, and the requested ratio will be implicitly connected to the most relevant contribution, according to the conditions of use of the vehicle.

Figure 1:
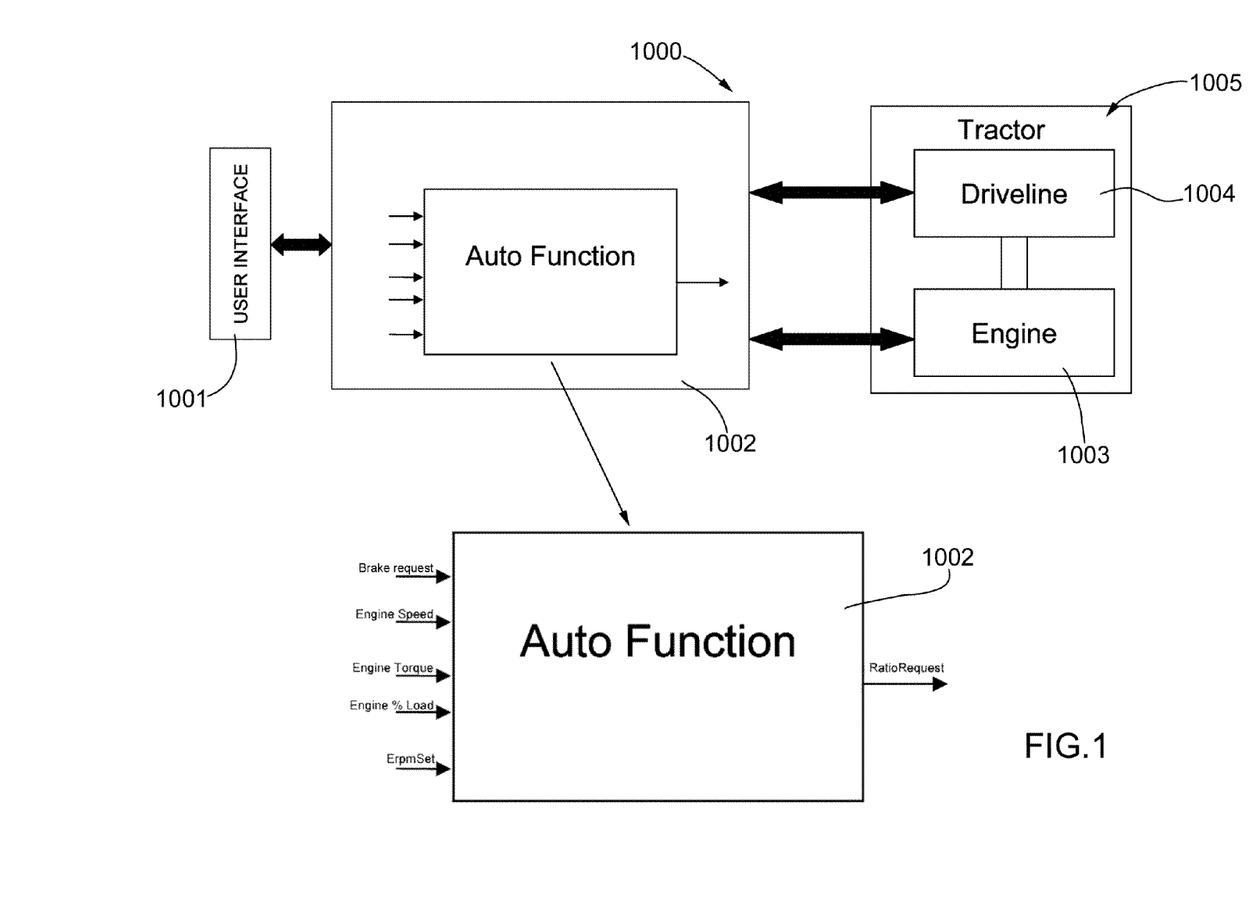
FIG. 1 shows a block diagram of an autofunction system object of the present invention.

In FIG. 1 the reference number 1000 indicates an autofunction control system for motor vehicles, in particular for agricultural tractors, object of the present invention.

The system 1000 comprises an user interface 1001, biunivocally connected to a data processing centre 1002. Said data processing centre 1002 is in its turn simultaneously connected to an engine 1003 and to a driveline 1004, both mounted on a tractor 1005.

As shown in the enlargement of FIG. 1, the inlet parameters in said data processing centre 1002 are the following:
Brake request;
Engine speed;
Engine torque;
Engine % load; and
Engine rate set by the driver (ErpmSet).

Generally speaking, after having carried out some calculations starting from the aforesaid parameters, the data processing centre 1002 sends to the driveline 1004 a request for varying the transmission ratio (Ratio request) in order to obtain the best ratio according to the criteria which will be described hereinafter.

Figure 2:
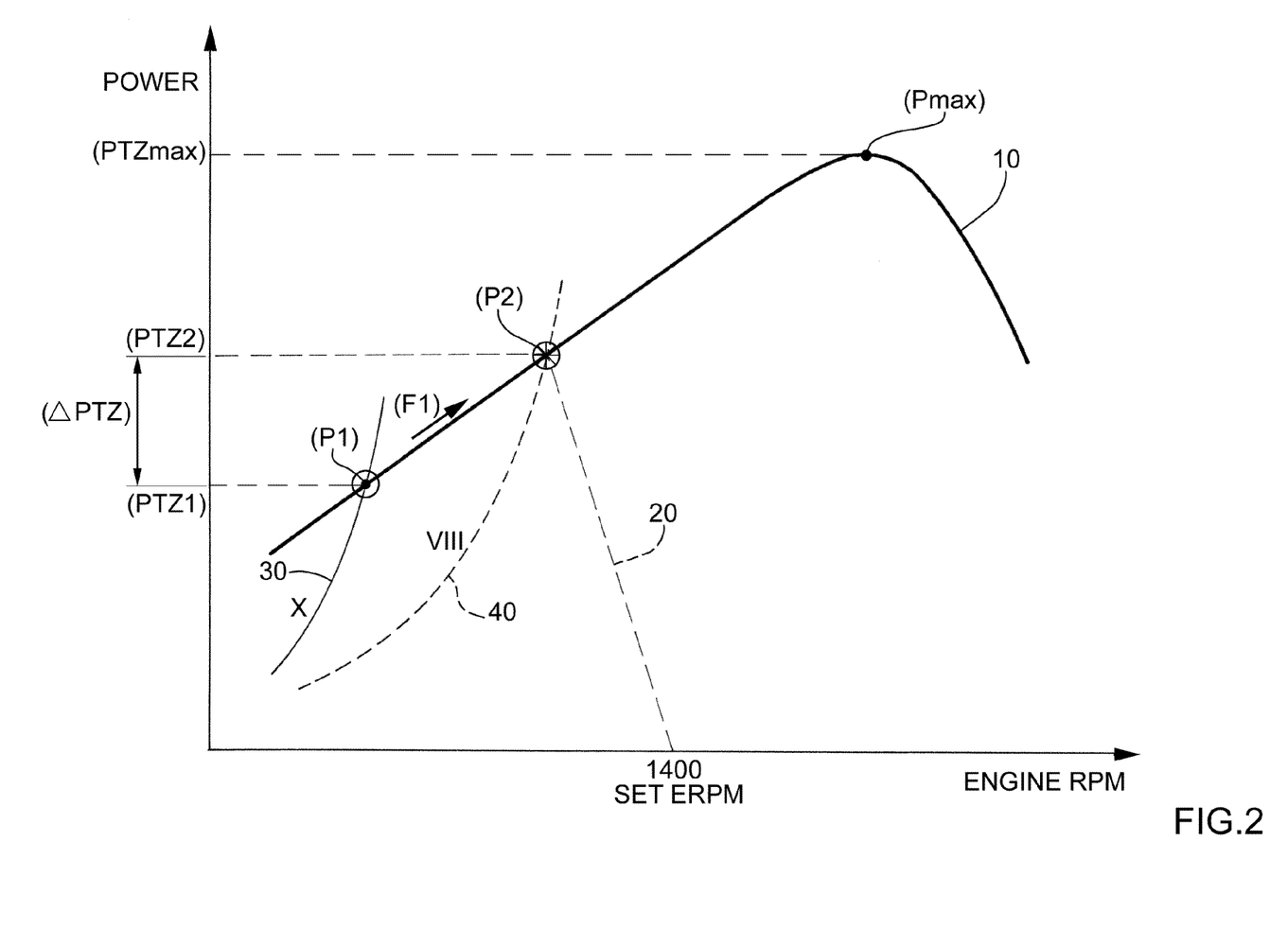
FIG. 2 shows a working diagram of the system according to FIG. 1, when the motor vehicle must avoid its own droop (anti-droop rate)

FIG. 2 reports some curves which are essential for understanding the present invention, wherein the abscissas report the values of the engine RPM, whereas the ordinates report the values of the (active or resistant) power of the tractor.

FIG. 2 globally indicates with the reference number 10 the maximum power curve of the engine.

As known, said curve 10 has a nearly linear progress to an absolute maximum point (Pmax; power (PTZmax)), then drops rather drastically after said absolute maximum point (Pmax). Furthermore, FIG. 2 indicates with the reference number 20 a work straight line of the engine control, said straight line starting from a SET ERPM previously defined by the driver (e.g. 1400 RPM) by setting the accelerator (not shown) of the motor vehicle at a determined angle of inclination.

It is worth remarking that the work straight line 20 is not parallel to the straight line of the ordinates because the engine control sets the progress of the straight line 20.

FIG. 2 shows two more curves 30, 40 having a substantially parabolic progress.

Curve 30 represents the resistant load with a first transmission ratio, for instance the X gear ratio, whereas curve 40 shows the progress of the resistant load with a second transmission ratio, for example the VIII gear ratio.

Imagine now to request 1400 RPM to the engine, thus setting the engine work at point (P2). However, the current working point of the motor vehicle is point (P1), given by the intersection of curve 10 with curve 30. This point (P1) corresponds to a value (PTZ1) of the maximum power delivered by the engine.

The motor vehicle is using the X gear ratio, but the RPM of the engine is dangerously decreasing because of the high resistance met by the traction, high resistance due, for example, to the insertion of an implement like a plough. For example, at point (P1) the engine is set at 850 RPM and it would droop without the intervention of an anti-droop system which is one of the objects of the present invention. As described hereinafter, this anti-droop system prevents the engine from drooping because it undergoes an excessive load.

In fact, noticing that the engine is at a point (P1) wherein the droop probability is high because of the high resistance met at a low RPM, the system 1000 induces the automatic change of ratio from the X gear ratio to the VIII gear ratio, thus moving the working point from point (P1) back to point (P2), given by the intersection of the engine control straight line 20 and of the load curve 40. Therefore, point (P2) corresponds to a value of the engine maximum power (PTZ2) higher than the aforesaid maximum power (PTZ1) (relating to point (P1)). Moreover, point (P2) is associated to a RPM close to the desired starting SET ERPM of 1400 RPM.

In other words, the system object of the present invention carries out anti-droop strategies for preventing the droop of the engine which, by means of a change of ratio, varies the engine working rate from point (P1) to point (P2) by covering the curve 10 according to an arrow (F1) to decrease the ratio.

In the anti-droop rate, an engine speed minimum threshold is set for each request of engine speed made by the driver. In other words, the system 1000 does not allow the engine speed to fall below this minimum threshold. This means that the system 1000 decreases the ratio to prevent the actual engine speed from falling below the minimum threshold set for each engine speed requested by the driver.

When the tractor is set in the "transport mode", namely when the tractor is on the road, for instance, if the brake pedal is pressed by the driver, the system 1000 readily decreases the ratio to make the engine brake quicker.

Figure 3:
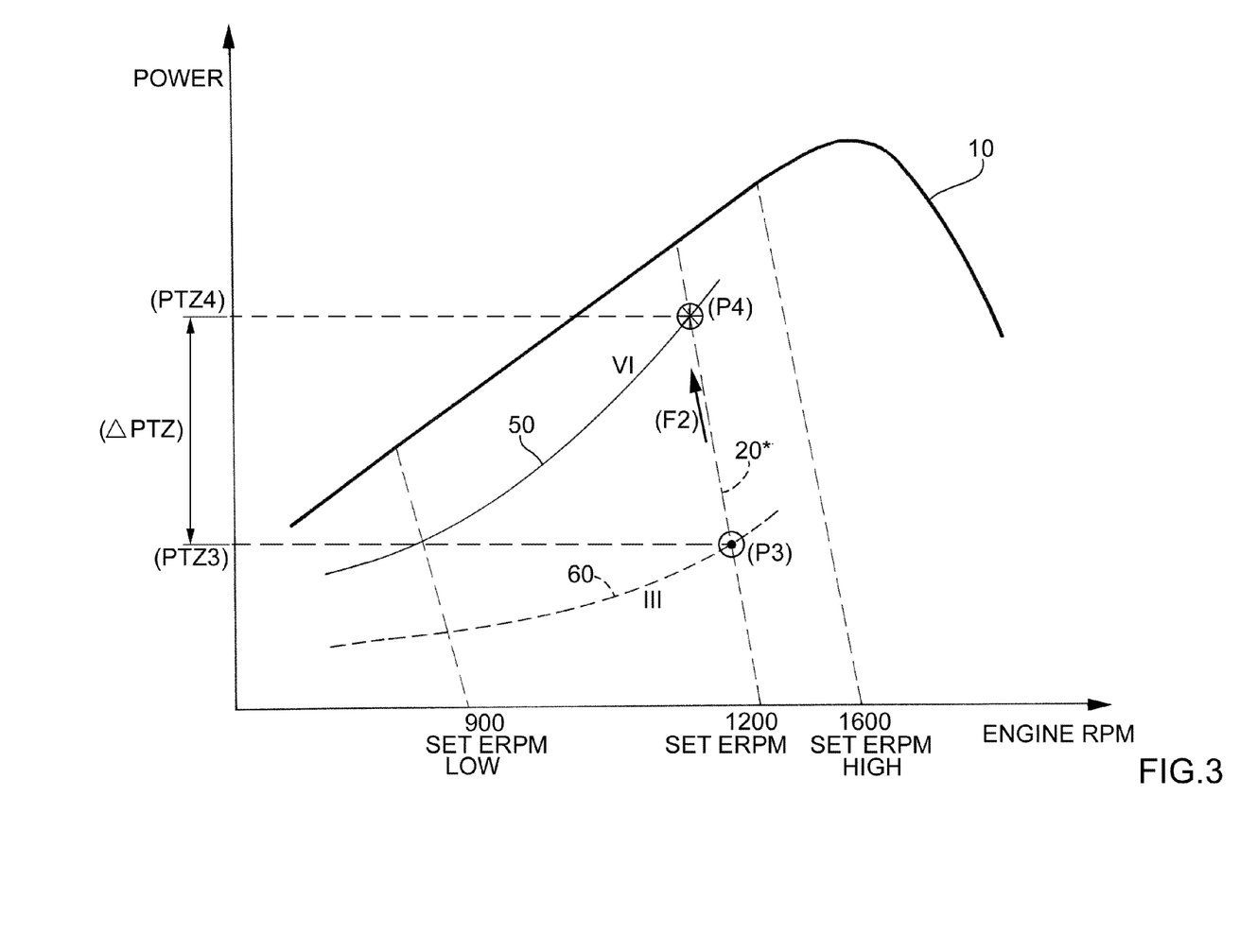
FIG. 3 shows a working diagram of the system of FIG. 1, when the motor vehicle is in the "go to max rate" state.

FIG. 3 shows a second state, called "go to max rate".

FIG. 3 reports the usual maximum power curve 10 of the engine. Curve 10 of FIG. 3 is the same of the analogous curve shown in FIG. 2, because it is assumed that it is always the same engine on the same motor vehicle.

Now imagine to set a straight line 20* corresponding to the SET ERPM. As usual, the straight line 20* is the engine control straight line.

The SET ERPM HIGH represents the minimum request of RPM with which the desired power is 100%; this means that all RPMs beyond the SET ERPM HIGH always require 100% of power. Analogously, the SET ERPM LOW is the maximum RPM which requires 0% of power.

Let it be assumed that in this case the SET ERPM HIGH is 1600 RPM, and that beyond this set RPM the system chooses the ratio leading the motor vehicle to the maximum power curve 10, namely 100% of power.

FIG. 3 shows known curve 10, a curve 50 corresponding to the VI gear ratio, and a curve 60 corresponding to a II gear ratio.

In this case the SET ERPM value, corresponding to straight line 20*, is comprised between the SET ERPM HIGH value (in this specific case 1600 RPM) and the SET ERPM LOW value (in this case 900 RPM).

Therefore, imagine that the requested RPM is 1200 RPM (straight line 20*). Moreover, let us assume that the driver did not completely press on the accelerator pedal, but chose to remain in a "partialized state", namely chose to deliver only a part of the available power.

The current working point is therefore point (P3) at power (PTZ3), whereas the engine is requested to reach a point (P4) at a higher power (PTZ4). The system 1000 allows to reach at least the requested percentage of power by increasing the ratio following the line 20* of the engine control according to an arrow (F2) from point (P3) to point (P4) with the same RPM (about 1200 RPM) but with a final power (PTZ4) higher than the starting power (PTZ3).

Under the conditions shown in FIG. 3, the "go to max rate" contribution is prevailing, and the RPM value requested by the driver is used to set a minimum percentage of power that the tractor must reach. This percentage is then compared to the effective one read on the engine. The system 1000 therefore induces a gear ratio increase as long as the difference is below a certain threshold value.

However, the system 1000 is such that the gear ratio is never decreased if the desired power value is trespassed by the gear ratio increase. This prevents the engine from being in a deadlock with a so called "gear hunting", thus jeopardizing the driving quality of the vehicle.

Moreover, in the present specification the term "dynamic rate" means the dynamic approximation of the transmission ratio in the driveline 1004 to fulfill the desired request of power.

The derivative of power (dP/dt) is constantly monitored in order to know the position of the working point.

In fact, as already known, the power is given by the following relation:

$$P=(ERPM)*(T)$$

wherein (ERPM) is the rpm and (T) is the torque value.

By deriving with regard to the time it is obtained:

$$dP/dr=(T)*d(ERPM)/dt)+(ERPM)*dT/dt \quad (1)$$

Therefore, while the first term of the relation (1) is connected to the derivatives of the ERPM, the second term is connected to the derivative of the torque (T). By keeping under continuous observation the variations of the two aforesaid terms the system is able to identify the optimal working condition to reach.

Figure 4:
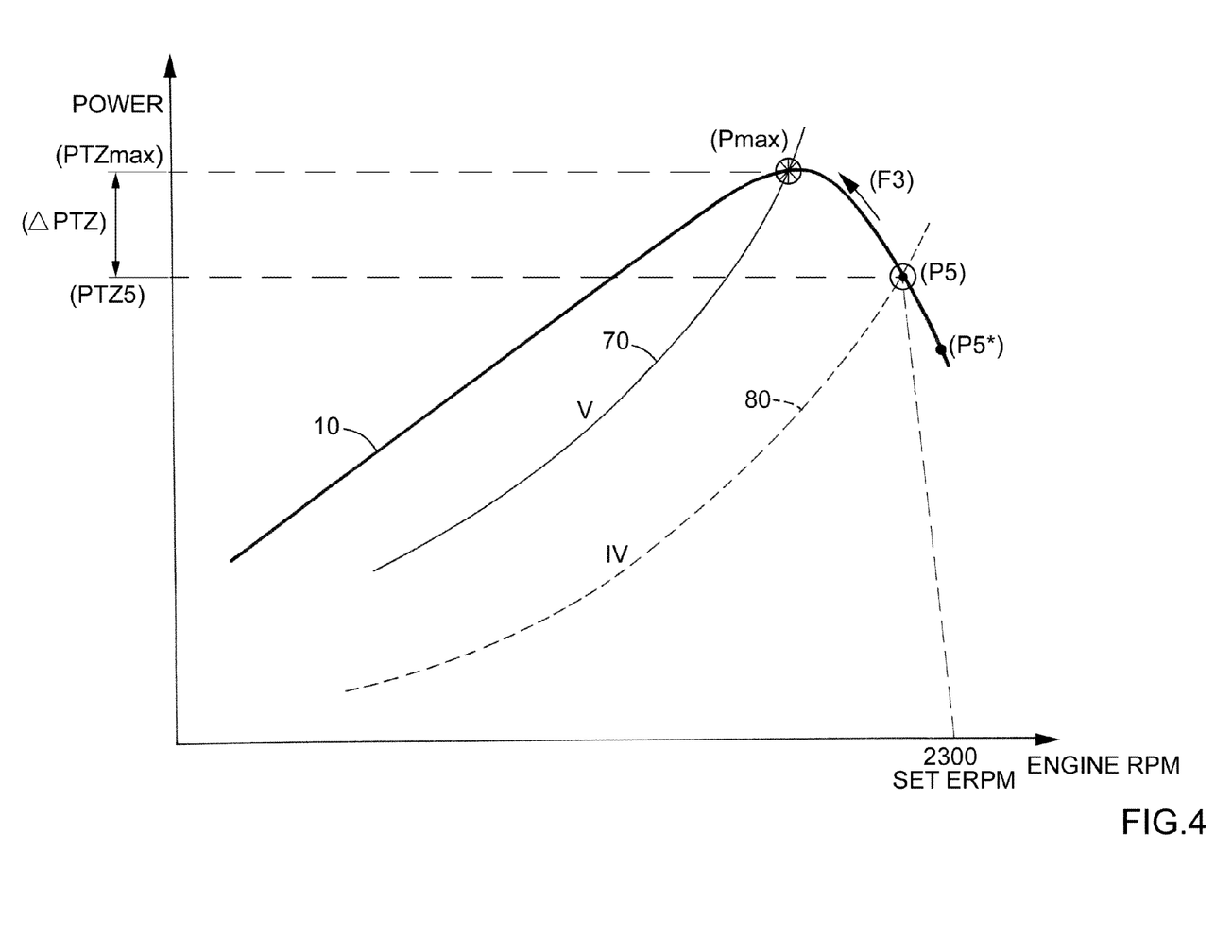
FIG. 4 shows a first working diagram of the system when a "dynamic contribution" function ("dynamic rate") is activated.

For instance, under the working conditions shown in FIG. 4 ("dynamic rate"), the starting point is (P5), which is already on the maximum power curve for the requested RPM (SET ERPM, which in this case are for example 2300). In FIG. 4 the curves 70, 80 represent the load progress, respectively with the V gear ratio and with the IV gear ratio.

The system 1000, being in the current working point given by the point (P5) (given by the intersection of curves 10 and 80) realizes that if the gear ratio has changed, passing from the IV to the V gear ratio, it is possible to increase the maximum power to go to point (Pmax) (power: (PTZmax)) (determined by the intersection of curves 10 and 70).

In other words, if point P5 were inclined to move towards a point P5*, a negative torque derivative and a positive RPM derivative would be obtained. This would cause the system 1000 to give a moving command from (P5*) to (Pmax) along the curve 10 and according to an arrow (F3).

Figure 5:
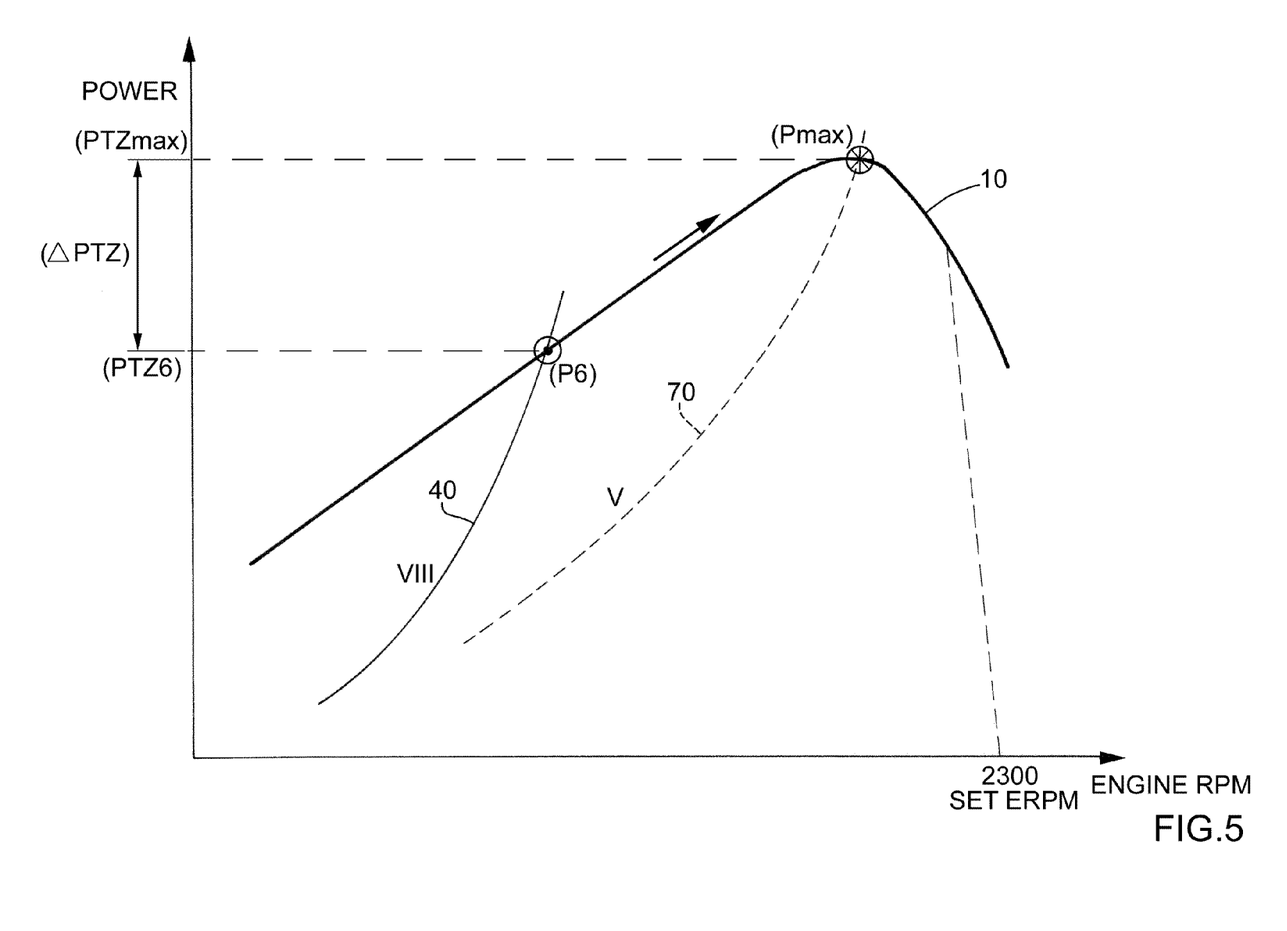
FIG. 5 shows a second working diagram of the system when the "dynamic rate" function is activated.

In the state shown in FIG. 5 ("dynamic rate"), the system 1000 notices that the current working point (P6) (power (PTZ6)) is on the maximum power curve 10, but not for the requested SET ERPM (e.g. 2300 RPM). In this case, by monitoring the power derivative, the system notices that the ratio must be decreased to reach point (Pmax) (power: (PTZmax)) higher than (PTZ6)). In other words, the system notices that the derivatives are negative, while it also calculates the value of the difference.

In short, it can be stated that in the strategy concerning the gear ratio management there are two requirements which are someway opposed. In fact, for the anti-droop rate the ratio must be decreased, whereas for the "go to max rate" state the ratio must be increased. Moreover, also the dynamic contribution must be taken into account.

Figure 6:
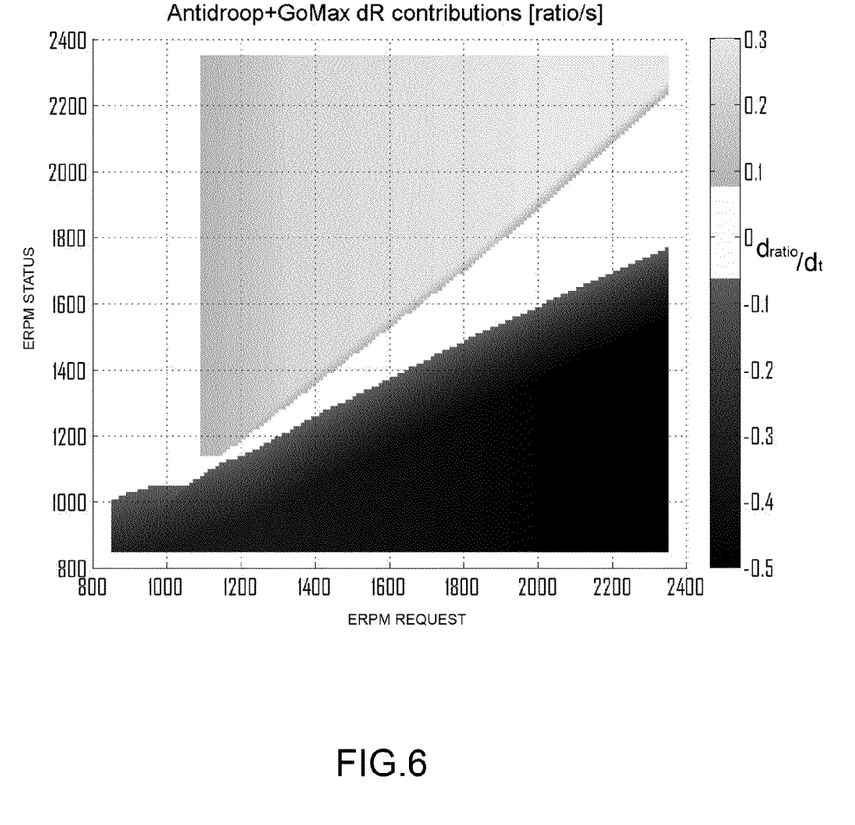
FIG. 6 shows a graph mapping the derivatives of the transmission ratio according to the rates set by a driver and to the values of the effective rates of the motor vehicle; the static contributions of the "anti-droop rate" and of the "go to max rate" are illustrated in the graph.

FIG. 6 maps the derivatives of the transmission ratio (dratio) according to the values of the ERPM requested by the driver and to the values of the effective ERPM of the motor vehicle. The intersection point between a couple of values settles whether the system 1000 must decrease the gear ratio because it is in the anti-droop rate, or it must increase the gear ratio because it is in a "go to max rate" state. However, the figure just gives some information regarding the static contribution due to the "anti-droop rate" or to the "go to max rate".

Figure 7:
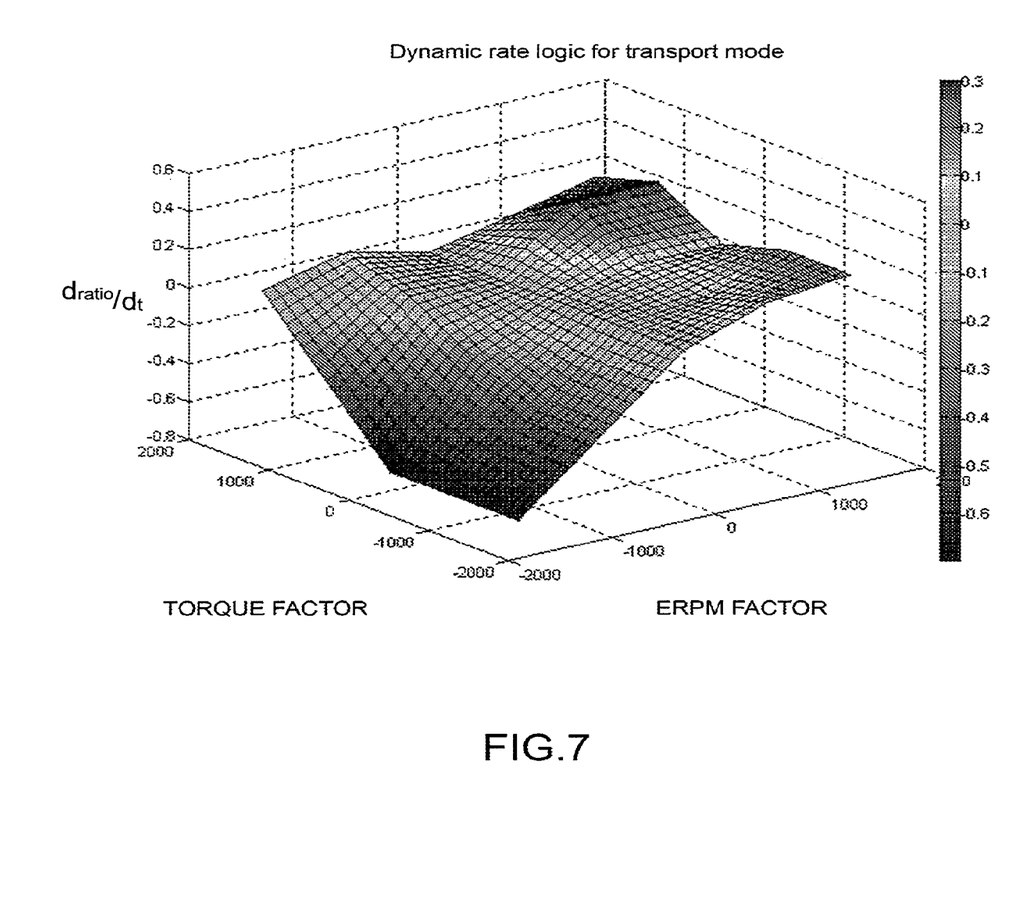
FIG. 7 shows a surface mapping the "dynamic rate" for the "transport mode"
Figure 8:
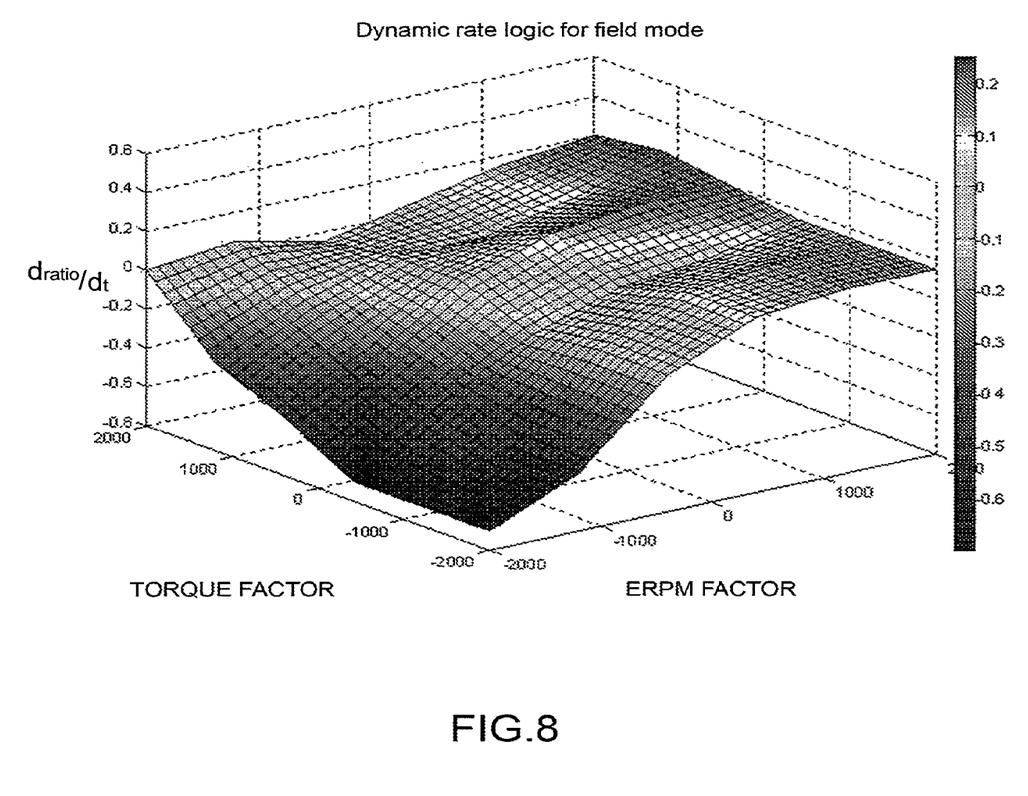
FIG. 8 shows a surface mapping the "dynamic rate" for the "field mode".

Therefore, for considering also the "dynamic rate" the surfaces represented in FIG. 7 (transport mode) and in FIG. 8 (field mode) must be introduced.

In these two diagrams, the abscissas report the "RPM factors" and the "torque factors", whereas the ordinates indicate how the ratios must vary.

In order to understand the trend of the surfaces shown in FIGS. 7 and 8, reference must be always made to the aforesaid relation (1): dP/dt=(T)*d(ERPM)/dt) (RPM factor)+(ERPM) *dT/dt (torque factor).

If, for example, the RPM derivative is negative, and the torque derivative is also strongly negative, it is obtained that also the ratio derivative (in both modes) is strongly negative and that therefore the ratio must be decreased.

The system object of the present invention is able to implement a supervision logic which, based on priority coefficients, puts together the various requests arrived (i.e. "anti-droop rate"; "go to max rate"; "dynamic rate") in a single command to the driveline of the motor vehicle.

The main advantage of the system object of the present invention is given by the fact that, since the autofunction controls the ratio to deliver an engine power which always guarantees the best performances under all conditions of use, it facilitates the driving performances of the tractor which can be driven by means of the brake and of the accelerator pedals only.

The invention claimed is:

1. An autofunction control system for a motor vehicle, comprising:
   an engine;
   a transmission;
   an accelerator, wherein a position of the accelerator defines a set engine rotation rate; and
   a processor configured to:
   determine a desired percentage of a maximum available power of the engine for the set engine rotation rate;
   control a transmission ratio of the transmission, while maintaining the set engine rotation rate, to load the engine at least to the desired percentage of the maximum available power while the set engine rotation rate is between a low predetermined threshold and a high predetermined threshold; and
   control the transmission ratio to load the engine to the maximum available power of the engine while the set engine rotation rate is above the high predetermined threshold.

2. The system of claim 1, wherein a rate of change of the transmission ratio is defined by the processor according to a first mapping for a first operation mode, the mapping defining the rate of change as a function of engine rotation rate and torque.

3. The system of claim 2, wherein the processor defines a rate of change of the transmission ratio for a second operation mode according to a second mapping different from the first mapping.

4. The system of claim 1, wherein the transmission is a powershift transmission or a continuously variable transmission.

5. The system of claim 1, wherein the accelerator is a hand lever or a foot lever.

6. The system of claim 1, wherein the desired percentage is below 100 percent while the set engine rotation rate is between the low predetermined threshold and the high predetermined threshold.

7. The system of claim 1, wherein the processor is configured to control the transmission ratio of the transmission by increasing the transmission ratio, while maintaining the set engine rotation rate, to load the engine at least to the desired percentage of the maximum available power while the set engine rotation rate is between the low predetermined threshold and the high predetermined threshold.

\* \* \* \* \*